_United States Patent Office_ 3,781,316
Patented Dec. 25, 1973

3,781,316
TRI-2-NORBORNYLTIN COMPOUNDS
Melvin H. Gitlitz, Edison, N.J., assignor to M&T
Chemicals Inc., Greenwich, Conn.
No Drawing. Filed Dec. 18, 1972, Ser. No. 316,045
Int. Cl. C07f 7/22
U.S. Cl. 260—429.7      5 Claims

ABSTRACT OF THE DISCLOSURE

Tri-2-norbornyltin compounds of the general formulae

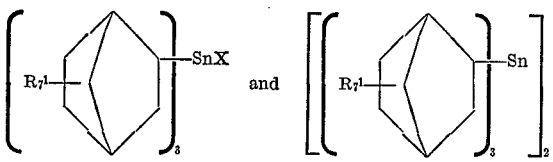

effectively combat fungi and mites when applied to objects, particularly plants, that are susceptible to attack by these organisms. The present compounds are particularly advantageous in that they are non-phytotoxic and therefore will not damage plants to which they are applied. In the foregoing formulae each $R^1$ is individually selected from hydrogen and lower alkyl radicals, X is a chlorine, bromine, fluorine, hydroxyl, carboxylate, phenoxy, alkoxy (—$OR^2$) or mercaptide (—$SR^2$) radical wherein $R^2$ represents an alkyl or aryl radical containing between 1 and 12 carbon atoms, inclusive and Y is an oxygen, sulfur, or a sulfate radical.

---

This invention relates to a method for selectively controlling fungi and mites using tri-2-norbornyltin compounds. The organisms against which the compounds are effective are responsible for a considerable portion of the annual damage to agricultural crops. Over the years fungi and mites have developed a resistance to many chemicals which had previously been effective in combating them. The development of resistant strains has mandated a search for new miticides and fungicides. Some triorganotin compounds effectively control these pests; however many of these compounds are relatively non-selective when applied to desirable plant crops, in that while the organism attacking the plant may be controlled, the plant itself is often killed or severely damaged.

SUMMARY OF THE INVENTION

It has now been found that triorbornyltin compounds of the general formulae

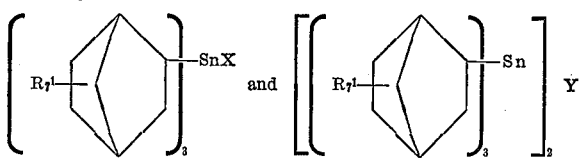

effectively control fungi and mites yet do not damage plants to which efficacious amounts of these compounds are applied. In the forgoing formulae, each $R^1$ is individually selected from the group consisting of hydrogen atoms and linear and branched alkyl radicals containing between 1 and 8 carbon atoms, X represents a radical selected from the group consisting of chlorine, bromine, fluorine, hydroxyl, carboxylate, phenoxy, alkoxy (—$OR^2$), and mercaptide (—$SR^2$), wherein $R^2$ represents an alkyl or aryl radical containing between 1 and 12 carbon atoms, inclusive and Y is an oxygen, sulfur, or sulfate radical.

DETAILED DESCRIPTION OF THE INVENTION

The trinorbornyltin compounds of this invention wherein X is chlorine, bromine or iodine are conveniently prepared by reacting the appropriate trinorbornylmonoorganotin compound with the appropriate stannic halide. This is a well known type of reaction and has been described in the chemical diterature for the preparation of numerous other triorganotin derivatives.

Tetraorganotin compounds which can be employed to prepare the corresponding triorganotin halides exhibit the generic formula

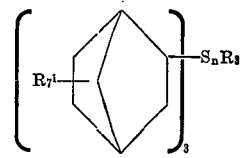

wherein $R^3$ represents a hydrocarbon radical selected from the group consisting of alkyl containing between 1 and 6 carbon atoms, phenyl, allyl and vinyl. Preferably the tetraorganotin compound is dissolved in a suitable solvent or mixture of solvents to which a solution of the desired stannic halide is gradually added. Suitable solvents are liquid aromatic, aliphatic and cycloaliphatic hydrocarbons and halogenated hydrocarbons. Any compound which is a liquid at the reaction temperature and does not react or coordinate with the stannic halide or the tetraorganotin compound can be employed as solvents for the reaction. The temperature of the reaction mixture is maintained between 25 and 50° C. preferably at ambient temperature, during addition of the stannic halide to control the degree of hydrocarbon radical cleavage, and maximize the yield of the desired product. The reaction using stannic chloride is believed to proceed in accordance with the following

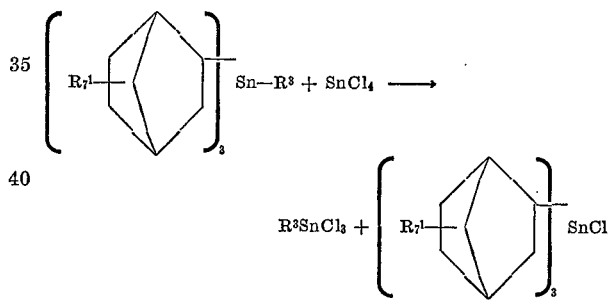

The resultant trinorbornyltin chloride may be a liquid or solid at ambient temperature depending upon the substituent(s) represented by $R^1$ and can readily be converted to other derivatives such as the oxide, acetate, and sulfate using known reactions. The desired anionic radical can be introduced by reacting the corresponding halide or oxide with the reagent indicated in the following table.

| Organotin derivative plus | Reagent | Desired product |
|---|---|---|
| Chloride, bromide or iodide. | Carboxylic acid plus acid acceptor, e.g. pyridine. | Carboxylate, e.g. acetate. |
| Do | Alkali metal salt of a carboxylic acid | Do. |
| Do | Aqueous solution of alkali metal hydroxide. | Oxide (or hydroxide). |
| Do | Alkali metal alkoxide or alcohol plus acid acceptor. | Alkoxide. |
| Do | Alkali metal phenoxide or phenol plus acid acceptor. | Phenoxide. |
| Do | Potassium fluoride or hydrofluoric acid. | Fluoride. |
| Do | Alkali metal sulfide | Sulfide. |
| Do | Alkali metal sulfate | Sulfate. |
| Do | Mercaptan plus acid acceptor | Mercaptide. |
| Oxide (or hydroxide). | Carboxylic acid or anhydride | Carboxylate. |
| Do | Alcohol (or phenol) | Alkoxide (or phenoxide. |
| Do | Hydrofluoric acid | Fluoride. |
| Do | Dilute (10–25 weight percent) aqueous sulfuric acid. | Sulfate. |
| Do | Hydrogen sulfide | Sulfide. |
| Do | Alkyl or aryl mercaptan | Mercaptide. |

The reaction conditions such as preferred solvents, temperatures and reaction times for preparing the derivatives summarized in the preceding table are known in the art and, therefore, do not require a detailed description in the present specification. A comprehensive treatment of this subject matter is contained in an article by R. K. Ingham et al. that appeared in the October, 1960 issue of Chemical Reviews (pp. 459–539). The trinorbornyltin compounds are liquids or solid materials at ambient temperature, depending upon the type of substituents represented by $R^1$, X and Y.

Tri-2-norbornyltin compounds effectively combat undesirable mites and fungi without damaging the plants to which the compounds are applied. A single application of these compounds can provide residual and extended control of fungi and mites for a considerable period of time, the duration of which is dependent to some extent upon mechanical and biological influences, including weather, but is sometimes as long as several months.

In preparing compositions for application to plants the organotin compound is often augmented or modified by combining it with one or more commonly employed pesticide additives or adjuvants including organic solvents, water or other liquid carriers, surface active dispersing agents or particulate and finely comminuted or divided solid carriers. Depending upon the concentration of the tin compound in these compositions, they can be employed either directly to control the organisms or as concentrates which are subsequently diluted with one or more additional inert carriers to produce the ultimate treating compositions. In compositions to be employed as concentrates, the tri-2-norbornyltin compound can be present at a concentration of from about 5 to about 98% by weight. Other biologically active agents that are chemically compatible with the present tin compounds can also be added.

The optimum concentration of tin compounds to be employed as toxicant in a composition for application to the organism directly or by employing its habitat for food as carrier, may vary provided that the organism is contacted with an effective dose of the toxicant. The actual weight of compound constituting an effective dose is primarily dependent upon the susceptibility of a particular organism to the tin compound. For combating apple scab, good results are obtained with liquid or dust compositions containing as little as 12.5 parts per million by weight of toxicant. Compositions containing up to 90 percent by weight of toxicant can be employed in the treatment of a mite-infested environment.

In the preparation of dust and compositions, the tri-2-norbornyltin compound can be blended with many commonly employed finely divided solids, such as fuller's earth, attapulgite, bentonite, pyrophyllite, vermiculite, diatomaceous earth, talc, chalk, gypsum, wood flour, and the like. In such operations, the finely divided carrier is ground or mixed with the toxicant or wetted with a dispersion of the toxicant in a volatile liquid. Depending upon the proportions of ingredients, these compositions can be employed as concentrates and subsequently diluted with additional solid of the types indicated hereinbefore, to obtain the desired amount of active ingredient in a comminuted composition adapted for the control of pests. Also, such concentrate dust compositions can be incorporated in intimate admixture with surface active dispersing agents such as ionic and non-ionic emulsifying or dispersing agents to form spray concentrates. Such concentrates are readily dispersible in liquid carriers to form spray compositions or liquid formulations containing the toxicants in any desired amount. The choice of surface active agent and amount thereof employed are determined by the ability of the agent to facilitate the dispersing of the concentrate in the liquid carrier to produce the desired liquid composition. Suitable liquid carriers include water, methanol, ethanol, isopropanol, methyl ethyl ketone, acetone, methylene chloride, chlorobenzene, toluene, xylene, and petroleum distillates. Among the preferred petroleum distillates are those boiling almost entirely under 400° F. at atmospheric pressure and having a flash point above about 80° F.

Alternatively, one or more tri-2-norbornyltin compounds can be dissolved in a suitable water-immiscible organic liquid and a surface active dispersing agent to produce emulsifiable concentrates which may be further diluted with water and oil to form spray mixtures in the form of oil-in-water emulsions. In such compositions, the carrier comprises an aqueous emulsion, i.e. a mixture of water-immiscible solvent, emulsifying agent and water. Preferred dispersing agents which may be employed in these compositions are oil soluble and include the condensation products of alkylene oxides with phenols and organic and inorganic acids, polyoxyethylene derivatives of sorbitan esters, alkylarylsulfonates, complex ether alcohols, mahogany soaps and the like. Suitable organic liquids to be employed in the compositions include petroleum distillates, hexanol, liquid halohydrocarbons and synthetic organic oils. The surface active dispersing agents are usually employed in the liquid dispersions and aqueous emulsions in the amount of from about 1 to about 20 percent by weight of the combined weight of the dispersing agent and the active toxicant.

When operating in accordance with the present invention, the trinorbornyltin compound or a composition containing the compound can be applied directly to the undesirable organism when mites are being controlled, or to their habitat or food in any convenient fashion, i.e. by means of hand dusters or sprayers or by simple mixing with the food to be ingested by the mites. Applications to the foliage of plants is conveniently carried out using power dusters, boom sprayers and spray dusters. When employed in this manner the compositions should not contain any significant amounts of phytotoxic diluents. In large scale operations, dusts or low volume sprays may be applied from an aircraft.

The following examples represent preferred embodiments of the present invention, and are not intended to limit the scope thereof. All parts and percentages are by weight unless otherwise specified.

Example 1.—Preparation of tris-2-norbornyltin chloride (a) 2-norbornylmagnesium bromide.—A 25 c.c. portion of solution containing 50 g. (0.286 mole) of exo-2-bromonorborane and 150 c.c. of anhydrous tetrahydrofuran was added to 8.35 g. (0.343 mole) of magnesium chips contained in a reactor equipped with a reflux condenser, mechanically driven agitator and nitrogen inlet. The contents of the reactor were heated to 40° C. and the reaction initiated by the addition of a few drops of ethylene dibromide. The remainder of the bromonorborane solution was then added dropwise over one hour while the reaction mixture was heated to the boiling point. Heating was continued for 1.5 hours following completion of the addition, at which time 200 c.c. of anhydrous tetrahydrofuran was added to dissolve the product, 2-norbornylmagnesium bromide. The reaction mixture was then cooled to ambient temperature and the liquid phase removed by decantation.

(b) Butyltri-2-norbornyltin.—A solution containing 19.2 g. (0.068 moles) of butyltin trichloride and 100 c.c. benzene was added over a 25 minute period to 335 c.c. of the solution prepared as described in section (a) which contained 0.67 moles of 2-norbornylmagnesium bromide per liter of solution. The temperature of the reaction mixture rose to 42° C. during the addition. Following completion of the addition the reaction mixture was heated to the boiling point for 20 minutes, stored at ambient temperature for about 16 hours with stirring, and finally heated to the boiling point for an additional hour. The reaction mixture was then allowed to cool to ambient temperature, at which time a solution of 25 g. ammonium chloride and 250 c.c. water was added to hydrolyze the reaction product. The organic phase which formed was separated and the water removed using anhydrous magnesium sulfate. The solid material was separated by filtration and the solvents removed under reduced pressure. The viscous residue was converted to a white solid during a washing with cold methanol. The solid material was isolated, washed with cold methanol and dried. The product contained 25.74% by weight of tin, compared with a calculated value of 25.73% for butyltri-2-norbornyltin.

(c) Cleavage of butyltin-2-norbornyltin.—A solution containing 9.9 g. (0.038 mole) of stannic chloride and 50 c.c. pentane was added over 15 minutes to a stirred solution of butyltri-2-norbornyltin (17.5 g., 0.038 mole) in 50 c.c. pentane. The reaction mixture was neither heated nor cooled during the addition of the stannic chloride. The initially colorless solution turned yellow during the addition. The reaction mixture was then heated to the boiling point for 15 minutes, during which time a white solid material precipitated. After cooling to room temperature the butyltin trichloride was extracted by the addition of 2 c.c. of concentrated (12 normal) aqueous hydrochloric acid and 48 c.c. water. The resultant mixture of a solid and two liquid phases was filtered to isolate the tris-2-norbornyltin chloride which was dried under reduced pressure. The solid product was found to contain 26.77% by weight of tin and 7.86% by weight of chlorine. The calculated values are 27.00% and 8.06%, respectively.

Example 2.—Preparation of bis(tri-2-norbornyltin) oxide

A solution containing 3.2 g. of sodium hydroxide, 25 c.c. of methanol and 25 c.c. of water was gradually added over five minutes to a stirred solution containing 17.6 g. of tri-2-norbornyltin chloride and 300 c.c. of acetone. A white solid precipitated during the addition, following which the reaction mixture was heated to the boiling point with stirriing for thirty minutes. A 500 c.c. portion of cold water was then added to the reaction mixture, which was subsequently cooled to 10° C. by placing the reaction vessel in a mixture of ice and water. The solid material in the reaction mixture was isolated by filtration and washed using 500 c.c. portions of water containing 20 drops of an alkyl-aryl sulfonate wetting agent until the wash water was free of detectable chlorides. The dried solid weighed 15.65 g. and was found to contain 28.79% by weight of tin. The theoretical tin content of bis(tri-2-norbornyltin) oxide is 28.80%. The infrared spectrum of the product showed an absorption at 750 cm.$^{-1}$ indicating the presence of an Sn—O—Sn linkage.

BIOLOGICAL ACTIVITY OF TRI-2-NORBORNYLTIN DERIVATIVES (1) General evaluation methods Tri-2-norbornyltin chloride and bis(tri-2-norbornyltin) oxide were evaluated in the form of sprayable compositions prepared by dissolving or dispersing the compounds in a 90/10 weight ratio water/acetone mixture containing a small amount of a non-ionic surfactant. The resultant stock solutions or dispersions were then diluted using a water-surfactant mixture to obtain the desired concentration of tin compound while maintaining the surfactant concentration at 100 parts per million (p.p.m.). Samples which proved difficult to emulsify were homogenized using a colloid mill or tissue homogenizer.

(2) Evaluation of the effectiveness of tri-2-norbornyltin compounds against specific organisms The efficacy of the triorganotin compounds of this invention as fungicides and miticides was investigated and the results are summarized in the following section. The test organisms employed were powdery bean mildew, apple mildew, apple scab, leaf spot of rice and the two-spotted spider mite.

The rating system employed to determine control of the organisms was based on a numerical scale wherein a rating of 10 indicated 100% control (no surviving organisms or fungus) and a rating of 0 indicated no control, i.e. the plant was heavily infested with the organism or fungus. The control rating employed for the fungi is a function of the fraction of total leaf which is unaffected by these fungi organisms.

(A) Powdery bean mildew.—Tender green bean plants with fully expanded primary leaves are placed adjacent to plants infested with the powdery mildew fungus (*Ersiphe polygoni*) 48 hours prior to the application of tri-2-norbornyltin chloride or bis(tri-2-norbornyltin) oxide. The tin compound is applied by placing the plants on a revolving turntable and spraying them with a formulation containing the triorganotin compound. When the spray deposit dries, the plants are placed in a greenhouse for between 7 and 10 days after which time the amount of mildew on the primary leaves is rated. Untreated plants serve as controls, which exhibit a rating of 0. The formulations tested contained 100 and 20 parts per million (p.p.m.) of bis(tri-2-norbornyltin) oxide and 100, 50 and 25 p.p.m. of tri-2-norbornyltin chloride.

Compound:                          Control Rating
   Tri-2-norbornyltin chloride, conc. (p.p.m.):
      100 _____ 10
      50 _____ 9.3
      25 _____ 7.3
   Bis(tri-2-norbornyltin oxide, conc. (p.p.m.):
      100 _____ 8
      20 _____ a 8.5 a Ratings of two different plants.

None of the formulations tested were phytotoxic to the bean plants.

(B) Apple mildew.—Apple seeds which had been refrigerated for 60 days were planted in pasteurized soil. When the resultant seedlings were in the fifth leaf stage the plants were sprayed with a formulation containing 50 p.p.m. of tri-2-norbornyltin chloride. On the following day they were placed among plants that were heavily infested with apple mildew. The sprayed plants were rated 14–21 days following the initial exposure to the mildew (first rating), after which the plants were again sprayed with the same formulation which had previously been employed. The rating was repeated 20 days and 35 days (second and third ratings, respectively) following the second spraying. None of the sprayed plants exhibited any phytoxic effects.

Concentration (p.p.m.) _____ 50
Control ratings:
   First _____ 8.7
   Second _____ 8.1
   Third _____ 8.0

(C) Apple scab.—Frozen apple leaves which were infested with conidia spores were soaked in cool water for about 30 minutes, following which the liquid phase was filtered through a single layer of cheesecloth. A number of apple seedlings in the fifth leaf stage were sprayed with the water containing the dispersed conidia spores. The seedlings were stored in a high humidity environment [relative humidity (R.H.)=100%] at ambient temperature for two days, after which they were stored at a temperature of 24±3° C. for seven days, then in the high humidity environment for between one and two days, and finally at 24±3° C. for 10 to 15 days, during which time the infested leaves were harvested. The leaves were extracted with cool water to prepare a stock solution which when viewed under a microscope at 100× magnification exhibited a field containing not less than 20 conidia spores.

The plants to be tested were sprayed with a liquid formulation containing 250, 50 or 12.5 p.p.m. of tri-2-norbornyltin chloride. The formulations were prepared as previously described. After the solvent had evaporated the leaves were sprayed with the suspension of conidia spores prepared as described in the preceding paragraph. The plants were then placed in a high humidity (100% relative humidity) environment at ambient temperature for two days, after which they were stored under conditions of ambient humidity and a temperature of 23±3° C. until evidence of apple scab was observed on the untreated control, as indicated by brownish lesions on the leaves. The results of the test are summarized below.

Concentration of organo-
tin compound (p.p.m.):              Control rating
   250 ------------------------------------ 9.0
   50 ------------------------------------- 8.0
   12.5 ----------------------------------- 8.0

The untreated control plant exhibited a rating of 3.9.

(D) Leaf spot of rice (Helminthosporium).—Rice plants were sprayed with a formulation containing 100 parts per million of tri-2-norbornyltin chloride using the procedure described in part A of this section. Once the spray had dried the leaves of the plants were inoculated with a suspension of Helminthosporium spores and placed in an incubation chamber for 24 hours, then stored under ambient conditions until lesions developed on the leaves of control plants which had not been treated with the organotin compound and which were inoculated with Helminthosporium spores and incubated concurrently with the treated plants. The treated plants exhibited a control rating of 7 when the control plants became completely infested (control rating=0).

(E) Two-spotted spider mite.—The leaves of bean plants were dipped into formulations containing a dispersed form of either tri-2-norbornyltin chloride or bis-(tri-2-norbornyltin) oxide. The concentration of the organotin compound was 50 or 200 p.p.m. A number of nymph stage and adult spider mites were then transferred onto the upper surface of the plant leaves. The plants remained undisturbed at 24±3° C. for between 8 to 12 days following exposure to the mites, at which time the control rating was obtained by observing percentages of dead nymphs and adult mites.

Concentration of tin
compound in spray (p.p.m.)         Control rating
  Chloride—200 ---------------- 10 (A); 10 (N)
  Oxide:
    200 -------------------- 10 (A); 10 (N)
    50 --------------------- 10 (A); 8 (N)

NOTE.—A=adult mites; N=nymph stage mites.

None of the spray formulations employed were phytotoxic to the plants.

Although the compounds employed to determine biological activity were tri-2-norbornyltin chloride and bis-(tri-2-norbornyltin) oxide, other derivatives including fluorides, bromides, carboxylates, mercaptides, alkoxides, phenoxides, sulfides and sulfates are expected to be at least equally efficacious in combating fungi and mites since it has been shown that the anionic radical of the present triorganotin compounds, represented by X and Y in the foregoing generic formulae, have little, if any, effect of the degree of biological activity exhibited by the compound unless the anion itself possesses significant biological activity.

What is claimed is:

1. A triorganotin compound represented by the general formula $$\left[R_7^1-\left\langle\!\!\!\bigcirc\!\!\!\right\rangle-\right]_3 SnX \quad \text{or} \quad \left[\left[R_7^1-\left\langle\!\!\!\bigcirc\!\!\!\right\rangle-\right]_3 Sn\right]_2 Y$$

wherein each $R^1$ is individually selected from the group consisting of hydrogen atoms and linear and branched alkyl radicals containing between 1 and 8 carbon atoms, X represents a monovalent radical selected from the group consisting of chlorine, bromine, fluorine, hydroxyl, carboxylate, phenoxy, alkoxy ($-OR^2$) and mercaptide ($-SR^2$), wherein $R^2$ represents an alkyl radical containing between 1 and 12 carbon atoms, inclusive and Y is selected from the group consisting of oxygen, sulfur and sulfate radicals.

2. The triorganotin compound of claim 1 wherein each $R^1$ represents a hydrogen atom.

3. The triorganotin compound of claim 1 wherein X represents a halogen radical.

4. The triorganotin compounds of claim 1 wherein Y represents an oxygen atom.

5. The triorganotin compound of claim 1 wherein X represents a hydroxyl radical.

References Cited
UNITED STATES PATENTS

| | | | |
|---|---|---|---|
| 3,264,177 | 8/1966 | Kenaga | 260—429.7 |
| 3,288,669 | 11/1966 | Hechenbleikner | 260—429.7 |
| 3,400,201 | 9/1968 | Mocotte | 260—429.7 |
| 3,546,240 | 12/1970 | Bublitz | 260—429.7 |
| 3,591,615 | 7/1971 | Bublitz | 260—429.7 |
| 3,591,614 | 7/1971 | Bublitz | 260—429.7 |
| 3,657,451 | 4/1972 | Horne | 260—429.7 |

WERTEN F. W. BELLAMY, Primary Examiner

U.S. Cl. X.R.

424—288

UNITED STATES PATENT OFFICE
CERTIFICATE OF CORRECTION

Patent No. 3,781,316          Dated Dec. 25, 1973

Inventor(s) MELVIN H. GITLITZ

It is certified that error appears in the above-identified patent and that said Letters Patent are hereby corrected as shown below:

Column 2, line 3 - Change "diterature" to read --literature--.

Column 2, line 10 - Change "$R_3$" in the formula to read --$R^3$--.

Column 2, line 32 - Change "following" to read --following formula--.

Column 6, line 31 - Change " $^a 8.5$" to read --$8, 5^a$--

Signed and sealed this 9th day of April 1974.

(SEAL)
Attest:

EDWARD M. FLETCHER, JR.
Attesting Officer

C. MARSHALL DANN
Commissioner of Patents